United States Patent [19]
Wagner

[11] Patent Number: 5,105,852
[45] Date of Patent: Apr. 21, 1992

[54] TUBULAR VALVE ARRANGEMENT

[75] Inventor: Rudolf Wagner, Fontnas, Switzerland

[73] Assignee: Mitsubishi Denki Kabushiki Kaisha, Tokyo, Japan

[21] Appl. No.: 731,299

[22] Filed: Jul. 16, 1991

Related U.S. Application Data

[63] Continuation of Ser. No. 548,140, Jul. 5, 1990, abandoned.

[30] Foreign Application Priority Data

Jul. 13, 1989 [CH] Switzerland .................... 626/89

[51] Int. Cl.$^5$ .............................................. F16K 3/02
[52] U.S. Cl. ........................ 137/625.33; 251/325; 417/423.14
[58] Field of Search ............... 137/625.33, 625.38, 137/309, 625.37; 251/325, 324; 417/423.3, 423.14, 901

[56] References Cited

U.S. PATENT DOCUMENTS

| | | | |
|---|---|---|---|
| 1,998,241 | 1/1933 | Keen et al. | 29/157.1 |
| 2,132,030 | 3/1936 | Hunt et al. | 251/76 |
| 4,397,331 | 8/1983 | Medlar | 137/375 |

Primary Examiner—Martin P. Schwadron
Assistant Examiner—Kevin L. Lee
Attorney, Agent, or Firm—Sughrue, Mion, Zinn, Macpeak and Seas

[57] ABSTRACT

A valve arrangement comprises a stationary tubular wall with a cover plate defining a housing and an opening in the wall. A second coaxial tubular wall or valve element acts as a closure element for closing the opening with seals acting through axial displacement relative to the stationary wall. This allows for a very compact construction with simultaneous good flow conditions. The valve arrangement can also be directly integrated into a pump housing whereby the use of available space is further improved. The low force expenditure for the closing operation as well as the possibility of continuously controlling the flow for the valve are further advantages.

20 Claims, 2 Drawing Sheets

TUBULAR VALVE ARRANGEMENT

This application is a continuation of application Ser. No. 07/548,140, filed Jul. 5, 1990, now abandoned.

FIELD AND BACKGROUND OF THE INVENTION

The present invention refers to a valve arrangement with at least one valve opening that can be sealed by a locking element.

For valves to be practical they must have high flow capacity and compact form. It is also important for a valve construction to have a low power requirement for overcoming the flow and positioning the valve to close off the flow. These requirements are of major importance when using valves in vacuum engineering. The manufacturing of integrated circuits, for instance, involves various steps that take place in vacuum processing systems. Depending on their specification, such processing systems are used for the manufacturing of thin films, for etching procedures, for procedures involving surface activation and for thermic and optical procedures. These procedures require, among other things, a very high purity of materials and environments. The smallest substrate contamination may bias the process and effect product quality or inhibit the manufacture of a functioning product at all. In this regard, the quality of the vacuum condition within which the processing takes place is also of major importance.

An expert is needed to dimension the vacuum system to create the necessary conditions in order to realize reasonably good results in vacuum quality. Both good vacuum conditions and economical product throughputs with such processing systems are mainly determined by the performance of the pumping system for creating the vacuum. In addition to correct dimensioning of the vacuum pump, special care is needed to keep pressure losses in valves and tubes of the system, as low as possible. It is often very difficult to meet these requirements when it comes to a practical construction of the system. If the tube configuration is unfavorably designed, losses within the tubes may increase to such an extent that the losses dominate the system and the influence of the pump becomes almost unapparent.

Vacuum systems with good pump performance thus, consist not only of efficient pumps but also of pump tubes with a high conductance or flow capacity. This requires relatively large sectional areas for the tubes. If valves are incorporated in the tubes, the transmitting sectional area across the valves must not reduce the conductance value. It is obvious that large tube sectional areas with the other needed specifications, require accordingly large valve opening sectional areas in order to keep losses low. Such large valve openings require high controlling forces to overcome the existing flow and pressure different which, in turn, requires both a robust valve construction and valve drive.

Because of these requirements, known valve constructions usually have large overall dimensions which considerably reduce the design possibilities for processing systems using the valves.

The high controlling forces linked to such valves create an additional problem. The forces must be held by appropriate bearings. Bearing problems in a vacuum environment are much more difficult to manage than other technical fields because of well-known lubrication problems. With extremely pure vacuum applications the use of lubricants is greatly reduced or may even be precluded altogether. In such a case, increased abrasion and therefore an increased generation of particles must be taken into consideration, especially where high friction forces exist. The generation of particles is greatly increased with high friction forces than with low ones.

When manufacturing micro circuits or when producing storage disks, such particles are not allowed due to the high purity requirement of such products. The existence of such particles means that, in the worst case, the product does not work and therefore is not usable. The planning and realization of such processing systems therefore include all possible precautions to prevent the generation of particles or to keep them at a controllable low level.

The U.S. Pat. No. 4,712,768 describes a "Butterfly" type valve. This type of valve is shown on a receptacle wall 7 in FIG. 2 herein. This valve 20 is incorporated with a cryo-pump 24 and is opened or closed by turning a valve plate 21 around a lateral axis (lying horizontally and in the plane of FIG. 2). Large tube diameters in this type of valve require a large diameter for valve plate 21. The size of this valve plate 21 then determines the necessary construction height of the arrangement as the necessary tilting area of the valve plate is given by its diameter. The pivot bearings have to absorb the entire force which mainly results from the pressure difference across the valve and the surface of the plate.

With this kind of valve, these forces dominate the friction and pressure forces of seals that are also needed in the valve. The high controlling forces require a relatively strong drive 22 which, with this kind of valve is incorporated laterally in the form of a rotating drive to rotate plate 21. Apart from the high construction height, such valves also require free space at the sides.

The industrial manufacturing of micro circuits by means of vacuum processing systems requires very compact system assemblies. This kind of system needs an expensive infrastructure in the buildings housing the system due to the required clean area conditions and the costly installations for the means needed to operate these systems. Today for instance, investment amounts of up to $10,000 to $20,000 per square meter are needed for construction of production areas in a manufacturing building having a class 10 clean area. The steadily increasing complexity of procedures also leads to more and more sophisticated equipment design. Economic reasons therefore dictate the use of compact assemblies (which thus require smaller clean areas) to meet increasingly high specifications.

A well structured compact system can also considerably improve maintenance and operability and thus guarantee economic operation and reliability of the system. The described systems often consist of numerous work stations with the result that several pumping systems have to be placed next to each other with only little space available. Valves as described in the aforesaid U.S. patent in many cases no longer meet these requirements.

Other known valves are disclosed in British patent specifications GB 1644/1909 and GB 1,550,459; French patents FR 965,427; FR 2,550,619; FR 1,532,450 and FR 1,322,491; German patent documents DE-U 8,812,723 and DE-C 1,193,432; and U.S. Pat. No. 4,520,846.

Of these, British patent specifications GB 1644/1909 and GB 1,550,459 and French patent FR 965,427 are material for showing sleeve shaped valve members that are movable to close the valve.

FIG. 1 herein shows another valve 19 which is known as a plate valve, where the valve plate 21, contrary to the valve 20 described in connection with FIG. 2, is not turned around a central axis, but is tilted in as a whole. Concerning compact design possibilities, this valve design has the same inconveniences as the one disclosed in FIG. 2. There is even an additional inconvenience in that the mechanism 22 for tilting the plate in requires much more effort than does the turning of the plate around a lateral axis.

In all the drawings, the same reference numerals are used to designate the same or similar parts.

FIG. 3 shows a schematic slide valve design 23. As shown in this figure, it is possible to design extremely flat valves. The problem is that the valve slider needs to pass a very long slide distance. The problems of compact design thus can not be solved optimally with this design. Due to high friction forces and large friction surfaces, the particle problem has an even higher impact in this design. German patent specification DE 3,209,217 disclosed such a slide valve.

In cases where a vacuum system requires pumps with high conductance or flow through values and/or extremely high pump values, the pumps 24 of FIGS. 1, 2 and 3 can be directly attached to the vacuum recipient chamber wall 7. Alternatively, they may be partly immersing in the vacuum chamber as shown at pumping device 12 in FIG. 4. This then is a practical solution in cases where no valving devices are required between the pump 24 and the processing chamber. FIG. 4 is a cross-sectional view of such a design. This arrangement is a commonly used cryo pump with cryo surfaces at 12 which form the pump element and which extend into the processing chamber. In this type of structure, due to the small spacing and good positioning of the pump elements in relation to the process, the pump is optimally positioned to achieve excellent results.

With many applications it is however necessary to separate the pumps from the chambers by valving devices 19, 20, or 23. These devices must, however, not degrade the optimum operational conditions provided by the kind of structure shown in FIG. 4.

SUMMARY OF THE INVENTION

The purpose of the present invention is to create a valve arrangement which removes the above-mentioned disadvantages. A object of the invention is to provide a valve with a highly compact design in both the axial and radial dimensions, which at the same time, has a very good flow through or conductance value. These advantages are reached by means of a design which requires low controlling forces and produces only few particles due to abrasion.

Accordingly, a further object of the present invention is to provide a valve arrangement comprising a valve housing having a tubular wall closed by a cover plate and having a plurality of circumferentially spaced openings therethrough, a tubular valve element which is displaceable with respect to the tubular wall for opening and closing the openings, and sealing arrangements between the valve element and the cover and between the valve element and a portion of the tubular wall which seal the valve element to the housing through relative axial movement between the valve element and the housing.

A further object of the present invention is to provide a valve arrangement which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

The present invention comprises a valve arrangement with coaxial tubular housing and valve members which move axially with respect to each other and which have axially facing sealing surfaces. Axial movement of one tubular element with respect to the other opens one or, preferably, a plurality of circumferentially spaced openings through the housing for establishing a pathway through the valve arrangement.

Figure 5:
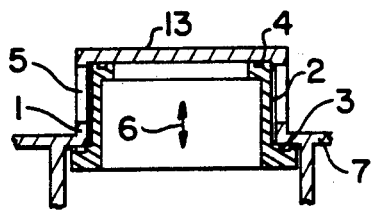
FIG. 5 is a schematic longitudinal sectional view of a preferred arrangement according to the invention, with an outer tube serving as a valve housing and with an axially movable coaxial inner tube element functioning as a controlling element.
Figure 6:
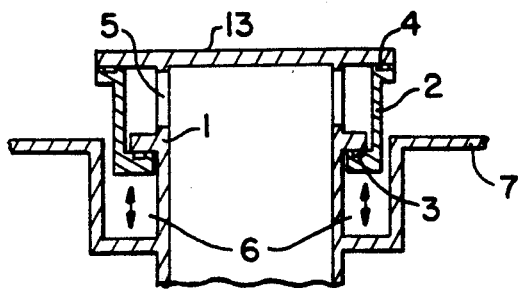
FIG. 6 is a view similar to FIG. 5 of another embodiment of the invention, with a fixed central housing and a coaxial and axially movable outer tube element functioning as a controlling element.
Figure 7:
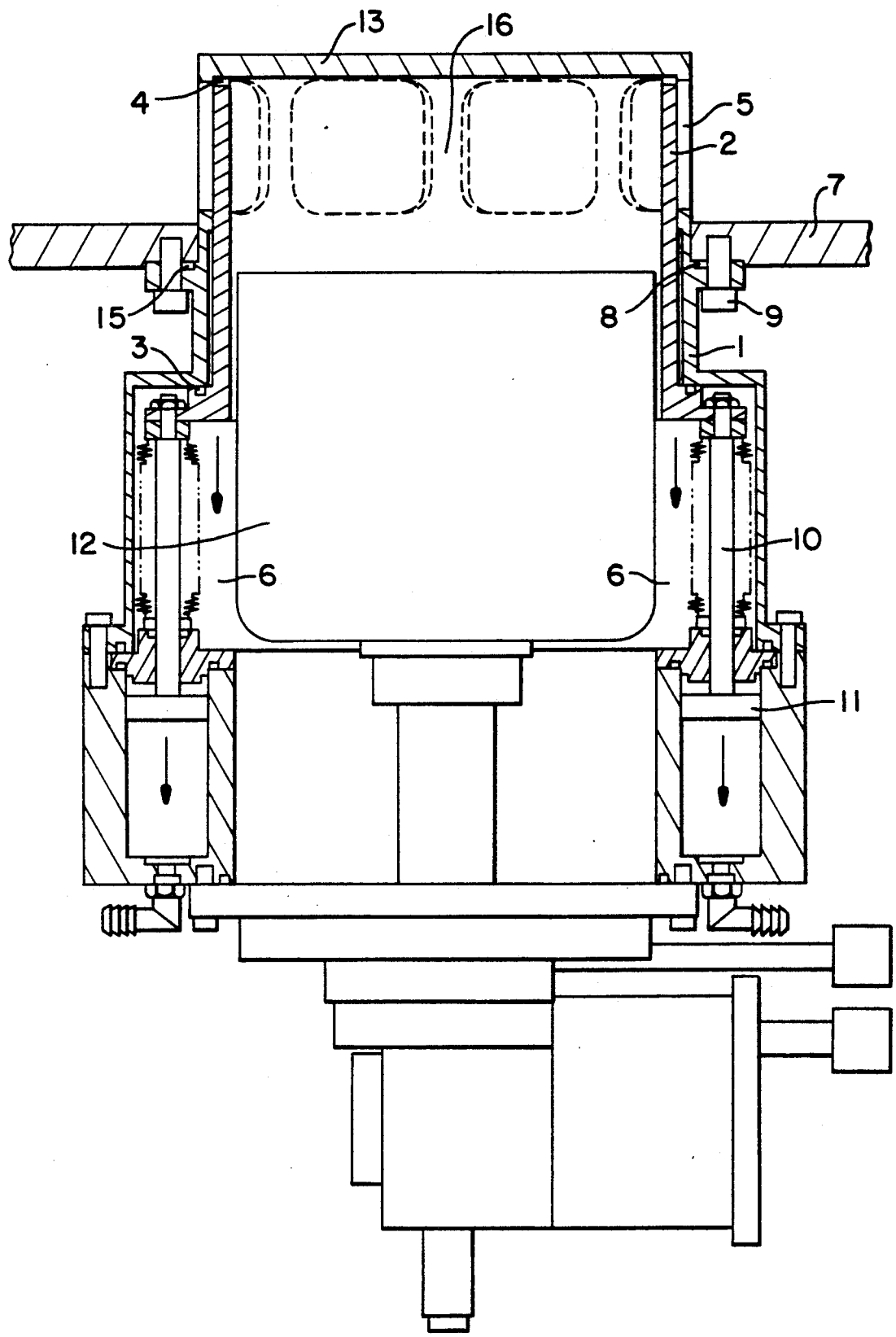
FIG. 7 is a sectional view of a further embodiment of the invention, partly in elevation, which is integrated in the housing of a cryo pump.

The housing of a valve according to the invention and as shown in FIGS. 5, 6 and 7 has the form of a tube or cylinder 1 which is closed by a cover or lid 13. A valve element 2 is movably mounted to and coacts with the housing for opening and closing the valve.

The tubular wall or tube 1 has several radial openings 5 lying as one line around tube 1 and through which the medium to be pumped will pass when the valve is open. As shown in FIG. 7, the housing may be fitted tight to the chamber wall 7 by means of a flange 15 and a bolted joint 9 with a seal 8 between the flange and the wall. The openings 5 preferably are placed close to the housing lid 13. These window-like openings 5 are separated by thin bars 16 which support the housing lid 13. The width of the bars 16 in relation to the openings 5 is kept very small in order to just absorb the forces acting on the housing lid 13. The sum of all cross sectional areas of openings 5 (shown partly in dotted line in FIG. 7) is determined by the specification needed, to make available a sufficient conductance or flow value through the valve. To get good results, the standard value of the entire cross section for all openings 5 should be approximately the same or greater than the cross sectional area of the tube or cylinder 1.

Tubular valve element 2 is coaxially to the tube-like housing. When in the closed position, this element seals the openings 5 through first and second seals or sealing surfaces 3 and 4 on the valve element which engage third and fourth annular sealing surfaces on the valve housing. FIGS. 5 through 7 show the valve in a closed or locking position. To open the valve, the valve element 2 is moved in an axial direction 6 until the openings 5 are cleared. To close the valve, element 2 is moved to press the seals 3 and 4 against the sealing surfaces on the housing cylinder 1 and the housing lid 13.

The forces originating from the pressure difference across the valve upon closing the valve, are radial and are carried by the valve element alone, due to the tube-like design of the valve. The closing of the valve mainly requires the drive only to apply forces required for the pressing of the seals 3 and 4 against the sealing surfaces.

Apart from its compact design, the design according to the invention is especially advantageous due to the low forces needed for positioning the valve into its closed position. The forces needed for the pressing of the seals 3 and 4 increase about proportionally with the valve's diameter. With traditional valve designs where an additional charge acts on bearings and drives due to the pressure difference across the valve, these forces increase proportionally with the cross section of the valve element surfaces and quadratically with the valve diameter.

The ring-shaped sealing surfaces 3 and 4 face the axial direction of relative movement between the tubular valve element 2 and the tubular housing 1, so that the only axial forces resisting the movement needed to open and close the valve is for pressing the sealing surfaces against each other. Seal 4 is on the radial inner surface of cover 13 and seal 3 is on an inner radial surface defined on a radial step of the housing. In the embodiment of FIGS. 5 and 6, the seal is extended in the same axial direction as surfaces on valve element 2 facing in an opposite axial direction.

Figure 1:
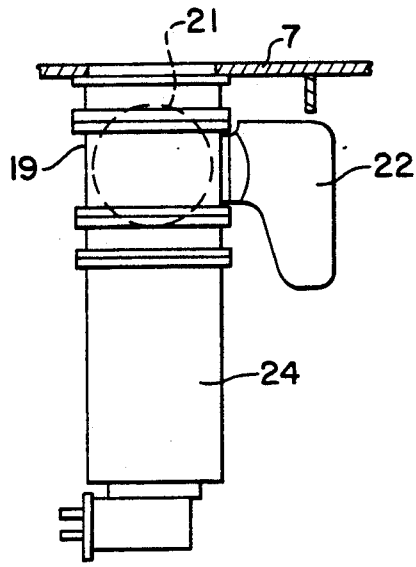
FIG. 1 is a side elevational view of a known valve arrangement with a valve plate which is tilted to open and close a passage through the valve arrangement.
Figure 2:
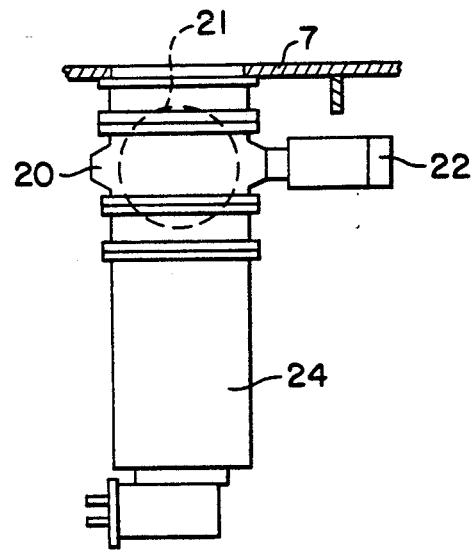
FIG. 2 is a view similar to FIG. 1 of another known valve arrangement where the valve plate pivots about a central axis.
Figure 3:
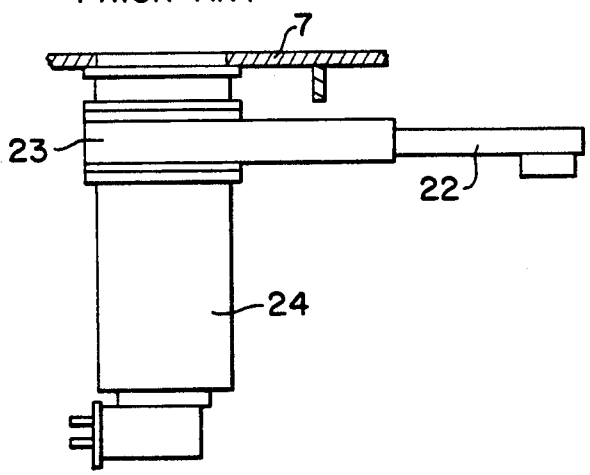
FIG. 3 is a view similar to FIG. 1 of a still further known arrangement where the valve plate slides to open and close a passage through the valve arrangement.
Figure 4:
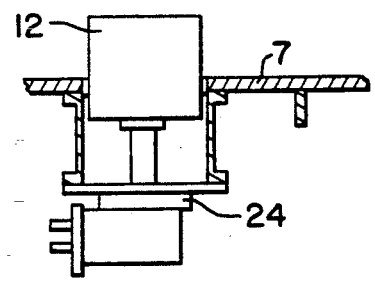
FIG. 4 is a view similar to FIG. 1 of a known getter or cryo pump.

Due to the low controlling and closing forces needed by the invention, the drive for the valve element 2 can be designed easily and in a compact manner. The bearing for element 2 is also simplified enormously. An additional advantage relating to the valve element's bearing and controlling arrangement is due to the fact that only axial forces are needed. FIG. 7 for instance shows a valve according to the invention which is directly incorporated into a cryo pump. The housing 1 is both pump housing and valve housing which is a favorable incorporation of functions to save space. When the valve is placed in the opened position, the distance between the processing chamber and the pumping surface or element 12 is extremely snort. Together with the large opening cross sections this results in especially favorable conditions for the pump behavior. It is possible to reach approximately the same values as can be reached with the aforesaid design described in FIG. 4.

In FIG. 7 for instance, the valve element 2 is moved and held by means of push rods 10 driven by compressed air pistons 11 in piston and cylinder combinations around cylinder 1. It is no problem, however, to use other known driving methods which produce translational movements. The arrangement shown in FIG. 7 represents a highly economic design with regard to the space needed.

It is of course possible to incorporate or attach such valves also to other pump types, for example to diffusion pumps, turbo molecular pumps, mechanical pumps, getter pumps etc. The valve need not only be used with a pump, but can also be incorporated into tubes or be used as a connecting element between chambers.

In addition to its closing or blocking function, another advantage of this valve lies in the possibility of continuously adjusting the flow across the value without needing the additional throttling devices usually required with other valve types.

In the field of thin film processing under vacuum conditions it often happens that procedures include gas charging. With the pressures and gas amounts required for such procedures, the pumps often cannot work at the correct working point without a throttling device to keep them at that optimal working point. This problem can be easily solved by means of the valve of the present invention as the valve element 2 can take positions lying between the open and closed positions. The openings 5 are thus more or less cleared according to the user's needs. This then results in a change of the conductance or flow value through the valve. The user has the possibility to fix different working points according to his or her needs, step by step or continuously without trottling means because no axial forces are exerted on the valve element 2 by the fluid flow.

In many cases it is however necessary to be able to equalize constantly changing conditions. In such cases it is preferable to use the present valve as a dynamic position link in a controlled system. The transmission behavior of the valve's throttling function is especially favorable with this form of use. The conductance or flow value is in a linear relation with the axial pushing direction 6. Such a positioning behavior is commonly desired with controlled systems in order to reach a stable and favorable operational behavior.

While specific embodiments of the invention have been shown and described in detail to illustrate the application of the principles of the invention, it will be understood that the invention may be embodied otherwise without departing from such principles.

What is claimed is:

1. A high vacuum pump and valve arrangement, comprising:

a vacuum pump having a pumping element (12);

a valve housing surrounding said pumping element and having, an axially extending tubular wall (1) and a radially extending cover plate (13) with a first ring-shaped sealing surface facing axially only, said tubular wall having a second ring-shaped sealing surface spaced axially from said first sealing surface, said second sealing surface facing axially only, said housing having at least one opening (5) extending radially through said tubular wall at a location between said first and second sealing surfaces, said at least one opening lying on a single line around said tubular wall (1) and near said cover plate (13);

a tubular valve element (2) having two opposite open ends and mounted for axial movement with respect to said tubular wall (1), said tubular valve element (2) having third and fourth ring-shaped sealing surfaces which are axially spaced from each other on said tubular valve element and which face axially only and in an opposite axial direction from said first and second sealing surfaces and axially toward said first and second sealing surfaces respectively, said third and fourth sealing surfaces being positioned so that with relative axial movement between said tubular valve element and said tubular wall in a closing position where said tubular valve element covers said at least one opening, said first and second sealing surfaces are axially engaged against said third and fourth sealing surfaces respectively, said tubular valve element (2) in an opening position at least partly and concentrically covering said pumping element (12); and a vacuum chamber wall (7) containing gas at high vacuum pressure, fixed to said tubular wall and having an aperture therethrough, the portion of said tubular wall carrying said at least one opening (5) and said cover plate (13) extending through said aperture and into said chamber.

2. An arrangement according to claim 1 wherein said tubular wall is positioned concentrically around said tubular valve element.

3. An arrangement according to claim 1 wherein said tubular valve element is positioned concentrically around said tubular wall.

4. An arrangement according to claim 1, wherein said tubular wall is concentric with said tubular valve element, the arrangement including a vacuum pump positioned within said tubular wall and within said tubular valve under said cover.

5. An arrangement according to claim 1, including drive means connected between said valve housing and said tubular valve element for axially moving said valve element with respect to said tubular wall by different amounts for covering said opening to different extents.

6. An arrangement according to claim 5, wherein said drive means moves said valve element with respect to said tubular wall in continuous fashion between an open condition where said valve element covers no part of said opening to a closed condition where said valve element completely covers said opening and said first and second sealing surfaces are engaged axially against said third and fourth sealing surfaces respectively.

7. An arrangement according to claim 5, wherein said drive means moves said valve element with respect to said tubular wall in steps between an open condition where said valve element covers no part of said opening to a closed condition where said valve element completely covers said opening and said first and second sealing surfaces are engaged axially against said third and fourth sealing surfaces respectively.

8. A valve arrangement according to claim 5, wherein said drive means comprises at least one axially extending cylinder defined in said valve housing and an axially movable piston in said cylinder connected to said valve element.

9. An arrangement according to claim 8, including a plurality of circumferentially spaced openings in said tubular wall which are simultaneously opened and closed by a relative movement between said valve element and said tubular wall.

10. An arrangement according to claim 9, wherein said tubular wall and valve element are concentric, an innermost one of said tubular wall and valve element having a cross-sectional area, the total cross-sectional area of said openings being at least as great as the cross-sectional area of the inner one of said tubular wall and valve element.

11. An arrangement according to claim 1, wherein said tubular wall and valve element are concentric, an innermost one of said tubular wall and valve element having a cross-sectional area, the total cross-sectional area of said openings being at least as great as the cross-sectional area of the inner one of said tubular wall and valve element.

12. An arrangement according to claim 1, including a vacuum chamber wall fixed to said valve housing, a portion of said valve housing carrying said opening extending into a vacuum chamber bounded by said vacuum chamber wall.

13. An arrangement according to claim 1, wherein said housing includes a radially extending step carrying said second sealing surface, said valve element having a radially extending step carrying said fourth sealing surface, a plurality of circumferentially spaced openings in said tubular wall, an inner one of said tubular wall and valve element having a cross-sectional area, the cross-sectional area of said openings combined being at least as great as the cross-sectional area of the inner one of said tubular wall and valve element, and linear drive means connected between said housing and said valve element for axially moving said valve element.

14. An arrangement according to claim 13, including a cylindrical cryo pump positioned within the inner one of said tubular wall and valve element.

15. An arrangement according to claim 13, wherein valve element is concentrically within said tubular wall.

16. An arrangement according to claim 14, wherein said tubular wall is concentrically within said valve element.

17. An arrangement according to claim 13, wherein said drive means comprises a plurality of circumferentially spaced axially extending cylinders in said housing, a piston axially slidable in each cylinder and a push rod fixed between each piston and said radial step of said valve element.

18. An arrangement according to claim 4, wherein said housing includes a radially extending step carrying said second sealing surface, said valve element having a radially extending step carrying said fourth sealing surface, a plurality of circumferentially spaced openings in said tubular wall, an inner one of said tubular wall and valve element having a cross-sectional area, the cross-sectional area of said openings combined being at least as great as the cross-sectional area of the inner one of said tubular wall and valve element, and linear drive means connected between said housing and said valve element for axially moving said valve element.

19. An arrangement according to claim 1 wherein said vacuum chamber wall defines a vacuum chamber and said valve element is mounted for movement in an opening direction outwardly of said vacuum chamber when said third and fourth sealing surfaces move axially away from said first and second sealing surfaces.

20. An arrangement according to claim 18 wherein said vacuum chamber wall defines a vacuum chamber and valve element is mounted for movement in an opening direction outwardly of said vacuum chamber when said third and fourth sealing surfaces move axially away from said first and second sealing surfaces.

* * * * *

UNITED STATES PATENT AND TRADEMARK OFFICE
CERTIFICATE OF CORRECTION

PATENT NO. : 5,105,852
DATED : April 21, 1992
INVENTOR(S) : Wagner

It is certified that error appears in the above-identified patent and that said Letters Patent is hereby corrected as shown below:

On the title page, Item [73] Assignee should read:

-- [73] Assignee: Balzers Aktiegesellschaft
                           Balzers, Liechtenstein --

Signed and Sealed this

Thirty-first Day of August, 1993

Attest:

BRUCE LEHMAN

Attesting Officer      Commissioner of Patents and Trademarks